United States Patent

Fox et al.

[15] 3,666,274

[45] May 30, 1972

[54] EASY LOADING TOY PHONOGRAPH

[72] Inventors: James H. Fox, Torrance; Darryl R. Dworkin, North Hollywood; Han Chung Leung, Los Angeles, all of Calif.

[73] Assignee: Mattel, Inc., Hawthorne, Calif.

[22] Filed: Dec. 21, 1970

[21] Appl. No.: 100,250

[52] U.S. Cl. ..................................274/9 B, 274/1 G, 274/14

[51] Int. Cl. ..................................................G11b 25/04

[58] Field of Search .......................274/1 A, 1 G, 9 B, 14, 15

[56] References Cited

UNITED STATES PATENTS

| | | | |
|---|---|---|---|
| 2,723,859 | 11/1955 | Stone | 274/14 |
| 3,222,073 | 12/1965 | Degaetano | 274/9 R |
| 3,446,505 | 5/1969 | Tiraboschi et al. | 274/1 G |

*Primary Examiner*—Harry N. Haroian
*Attorney*—Seymour A. Scholnick

[57] ABSTRACT

A relatively simple toy phonograph for playing interchangeable disc records including a control lever with an eject knob for ejecting a record and a replay knob for replaying it, both on the same surface as the slot through which the record moves. When the replay knob is depressed, a first camming portion thereon pivots a lever that lifts the tone arm and a second portion thereon moves the tone arm to the outer edge of the record to replay it. When the eject knob is depressed, it pivots an eject lever which has camming surfaces that raise a spindle to release the record, pivot the lever that lifts the tone arm, push against the rim of the record to eject it, push the tone arm to the periphery of the turntable, and open the motor energizing circuit. When a new record is inserted, it pushes the eject cam to automatically start the mechanism to play the new record. An electrically conductive spring member is provided that has one arm at the battery case for contacting a battery terminal, another arm in contact with an electric motor terminal, and a pair of additional arms that function as mechanical springs.

12 Claims, 10 Drawing Figures

JAMES H. FOX
DARRYL R. DWORKIN
HAN CHUNG LEUNG
INVENTORS

BY Max E. Shirk
ATTORNEY

JAMES H. FOX
DARRYL R. DWORKIN
HAN CHUNG LEUNG
INVENTORS

BY Max E. Shirk
ATTORNEY

JAMES H. FOX
DARRYL R. DWORKIN
HAN CHUNG LEUNG
INVENTORS

BY Max E. Shirk

ATTORNEY

JAMES H. FOX
DARRYL R. DWORKIN
HAN CHUNG LEUNG
INVENTORS

BY Max E. Shirk
ATTORNEY

JAMES H. FOX
DARRYL R. DWORKIN
HAN CHUNG LEUNG
INVENTORS

BY Max E. Shirk
ATTORNEY

EASY LOADING TOY PHONOGRAPH

BACKGROUND OF THE INVENTION

1. Field of the Invention

This invention relates to toy phonographs.

2. Description of the Prior Art

The entertainment value of many types or toys such as dolls can be enhanced by including small toy phonographs in them. Such phonographs have generally been constructed so that one record was employed that remained permanently in the phonograph. Greater entertainment could be provided by enabling a change of records. However, a mechanism that allowed for a change of records must still operate in an extremely simple manner without requiring instruction to children as to how to operate it and with a high resistance to damage from improper use. Furthermore, such a toy phonograph must be constructed so that it can be produced at very low cost to enable it to be included in toys that sell at a low price. Such a toy phonograph would be valuable for inclusion in other toys such as dolls, and would also be useful as a toy in itself.

OBJECTS AND SUMMARY OF THE INVENTION

An object of the present invention is to provide an economical toy phonograph that can play interchangeable records, and which is extremely simple to operate.

Another object is to provide a phonograph with interchangeable records suitable for use by a child, which employs a minimum number of different parts.

In accordance with one embodiment of the present invention, a toy phonograph is provided which enables a child to play a record by merely pushing it into a slot, to replay the record by pushing one knob, and to remove the record by pushing another knob. The phonograph includes a control lever which has a replay knob portion that can be depressed to replay a record and an eject knob portion which can be depressed to eject a record from the phonograph. When the replay portion is depressed, a first camming surface thereon operates a lever that lifts a tone arm off the record while a second camming surface thereon pushes the tone arm to the periphery of the record to enable replaying. When the eject portion of the control lever is depressed, it moves an eject lever that has several camming surfaces on it. These include a first surface which pivots the lever that lifts the tone arm, a second which raises a spindle that releases the record from the turntable, and a third that moves the tone arm to the edge of the turntable. The eject lever also has a finger that pushes against the edge of a disc record to eject it from the housing, and a surface that opens contacts to de-energize the motor.

The replay and eject knob portions are located on the same surface as the slot through which records are received and ejected. This facilitates mounting of the phonograph mechanism in another toy. For example, a large recess formed in the back of a doll is sufficient to hold and permit access to the mechanism, the record-receiving slot and all controls then lying at the back surface of the doll.

The phonograph mechanism includes a unitary electrically conductive spring member that has one arm in the battery holder to contact a battery terminal, a second arm in contact with a motor terminal, a third arm which is biased against the spindle to urge it towards the turntable, and a fourth arm that tends to maintain the control lever in a neutral position. A pair of conductive spring members can contact one another to electrically connect the other motor terminal to the other battery terminal. These two spring members are positioned to be moved apart to stop the motor when the tone arm has reached the runout groove at the center of the record, and also when the eject lever has pivoted to eject a record, so that the battery is not unnecessarily depleted.

The novel features of the invention are set forth with particularity in the appended claims. The invention will be best understood from the following description when read in conjunction with the accompanying drawings.

DESCRIPTION OF THE PREFERRED EMBODIMENTS

Figure 2:
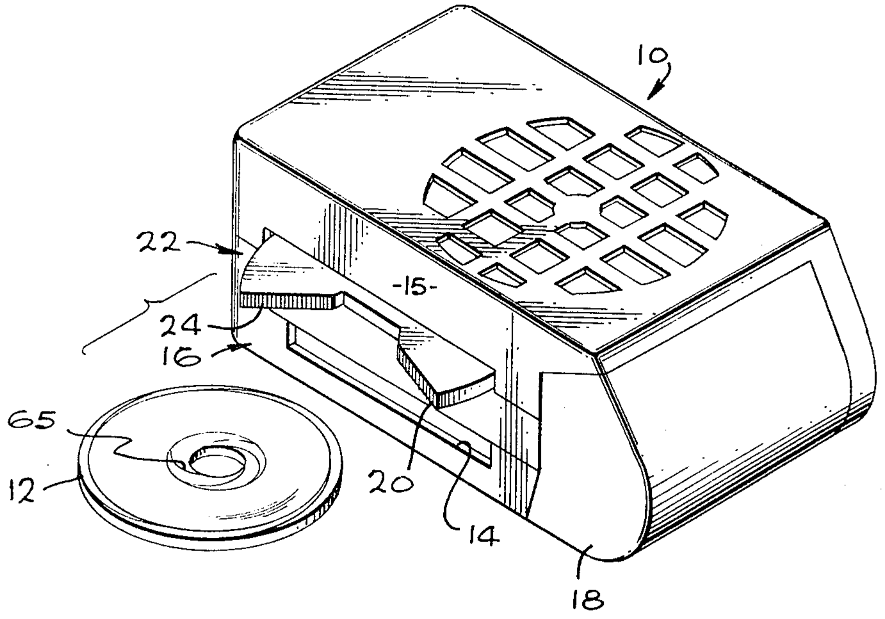
FIG. 2 is a perspective view of the phonograph of FIG. 1 with a record ready for insertion therein.

FIG. 2 illustrates the toy phonograph 10 which is designed to receive and play a disc record 12. A child plays the record 12 by inserting it through a slot 14 in the front surface 15 of a housing 16. The record begins to play as soon as it is fully inserted, and stops playing as soon as the record has been completely played. The phonograph is powered by a battery contained in a battery compartment 18 of the housing, and is constructed so that at the completion of a record playing, electrical contacts leading to a motor with the phonograph are opened to prevent any further battery drain. If a child wishes to replay the record, he merely depresses and releases a replay knob portion 20 of a control lever 22. If the child wishes to eject the record, he merely depresses an eject knob portion 24 of the control lever. Depression of the eject knob 24 causes the record 12 to protrude out through the slot 14, so that a new record can be inserted or the record can be turned over and reinserted to play its other side. The phonograph 10 can be included as part of a talking toy or may be sold as a separate item.

Figure 1:
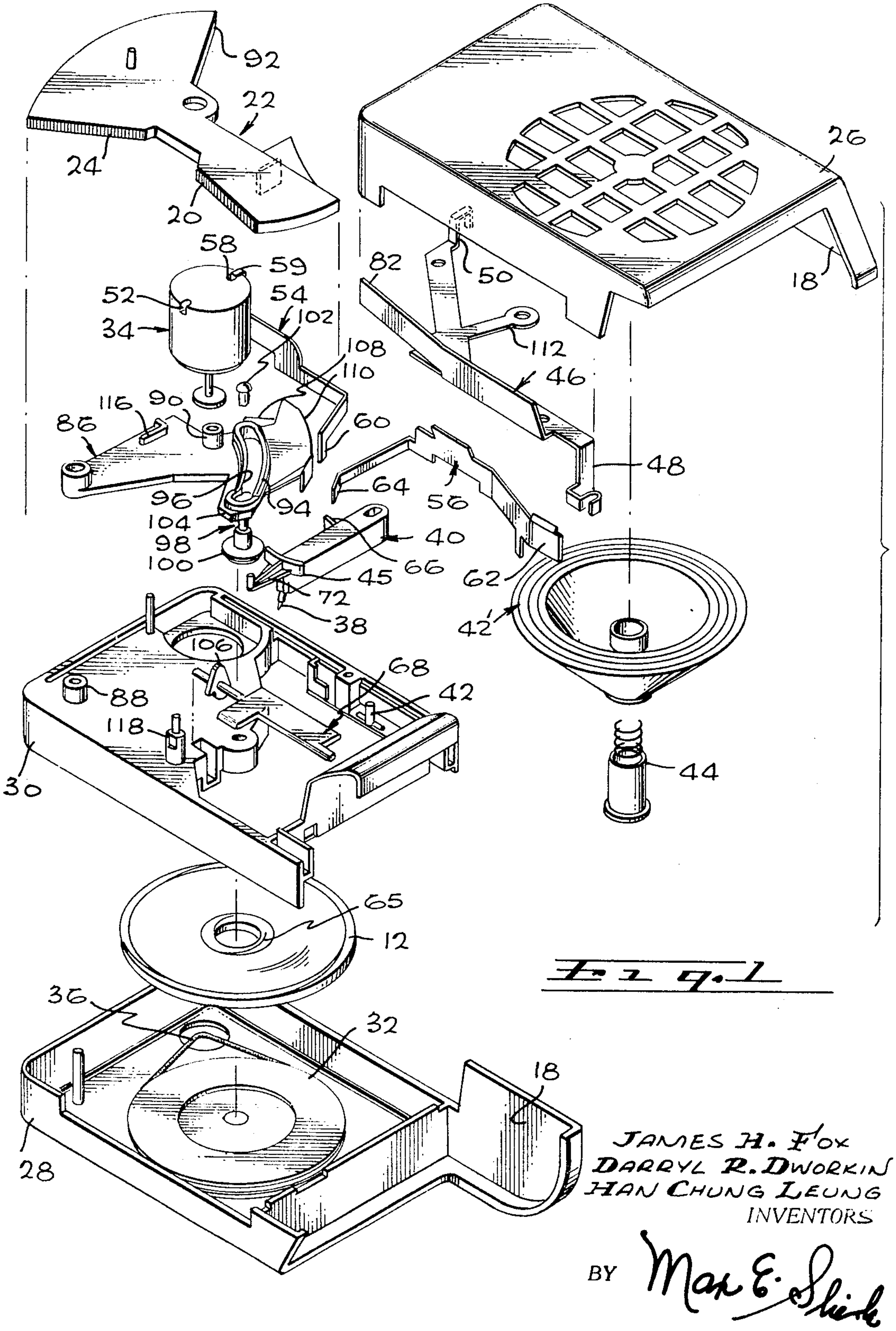
FIG. 1 is an exploded perspective view of a toy phonograph constructed in accordance with the invention.

Referring to FIG. 1, the phonograph housing includes an upper housing member 26, a lower housing member 28 and a middle housing member 30 which is held between the upper and lower members. The record is rotated by a turntable 32 which is rotatably mounted on the lower housing member and which is driven by an electric motor 34 that drives a belt 36 coupled to the turntable. A record is played by a needle or stylus 38 which is held on a tone arm 40 which has an inner end pivotally mounted on a post 42 of the middle housing member. Vibrations picked up by the stylus are coupled to a speaker cone assembly 42' which has an armature 44 biased against a ridge 45 on the tone arm 40. Sounds that are acoustically amplified by the speaker cone emerge through a grill portion of the upper housing member 26.

Current for energizing the motor 34 is obtained from one common flashlight type battery (not shown) which is held in the battery compartment 18 of the housing. An operator member 46, which is constructed of a resilient electrically conductive material, carries current directly from one battery terminal to one motor terminal. The operator member 46 has one arm 48 that lies at one end of the battery compartment to directly contact a battery terminal, and another arm 50 which directly contacts a motor terminal 52. Two contact members 54 and 56 are employed to connect the other motor terminal 58 to the other battery terminal. The first contact member 54 has one end 59 in contact with one motor terminal and another free end 60. The second contact member 56 has one end 62 at the battery compartment to directly contact another battery terminal and another end 64 positioned to contact the end 60 of the first contact member. The contact member ends 60 and 64 are biased together during playing of the phonograph, but can be separated either at the end of a record playing or when the record is ejected.

An understanding of the operation of the phonograph can best be gained by first considering operation during playing of a record which has just been inserted, then the operations in replaying the record, then the operations involved in ejecting the record, and finally the operations involved in inserting a new record.

Figure 3:
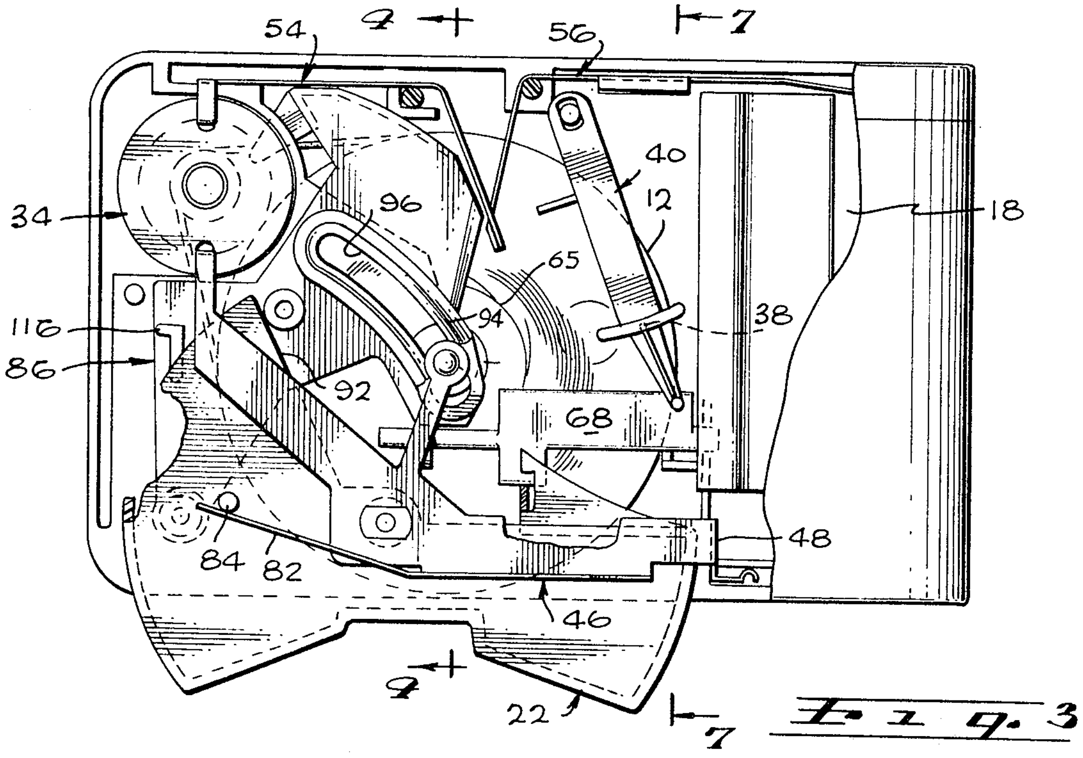
FIG. 3 is a plan view of the phonograph of FIG. 1 at the beginning of a record playing, shown with the upper housing member removed.
Figure 5:
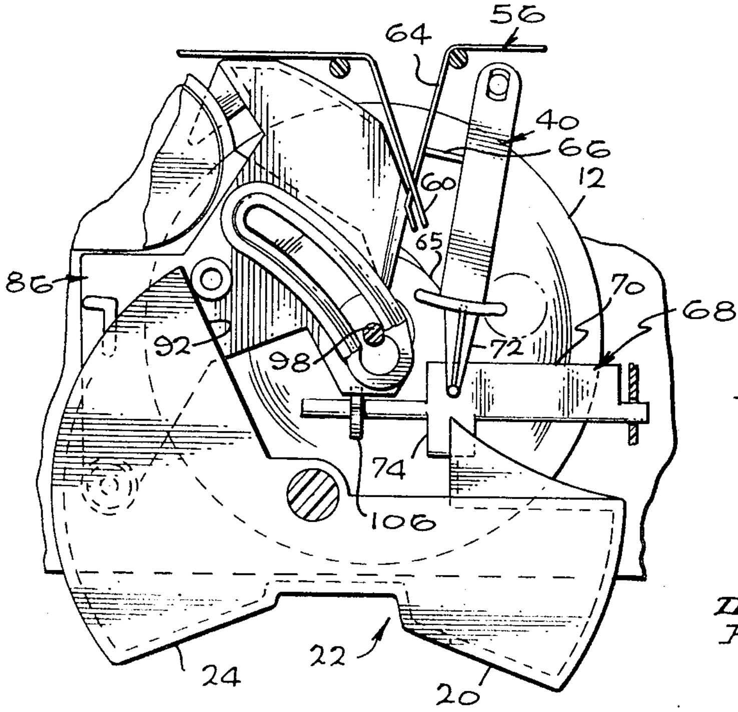
FIG. 5 is a partial view similar to FIG. 3, but showing the phonograph at the end of a record playing operation.

FIG. 3 illustrates the phonograph mechanism at the start of play of a record 12 that has just been inserted therein. As the tone arm 40 tracks the spiral groove in the record, it moves towards a runout groove 65 at the center of the record. FIG. 5 illustrates the situation as the tone arm 40 approaches the runout groove 65, after having played the record. A de-energizing member 66 on the tone arm contacts the free end 64 of the second contact member, deflecting it away from the free end 60 of the first contact member, and thereby opening the electrical circuit and stopping the motor. The phonograph can be left indefinitely in this position. However, if a child wishes to hear the record again (either the same recording or another recording that may be defined by another parallel spiral groove on the same record side) then he depresses the replay knob 20 of the control lever 22.

Figure 6:
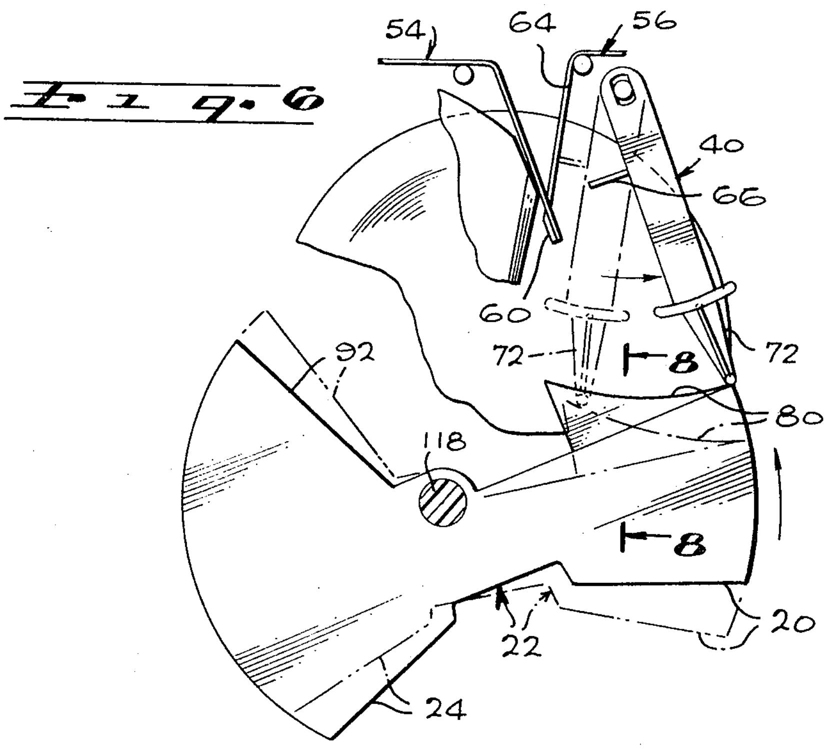
FIG. 6 is a partial view similar to FIG. 3, but showing the replay apparatus thereof.
Figure 8:
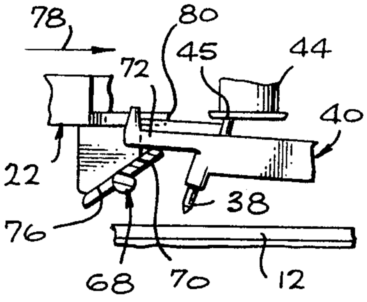
FIG. 8 is a view taken on the line 8—8 of FIG. 6.
Figure 7:
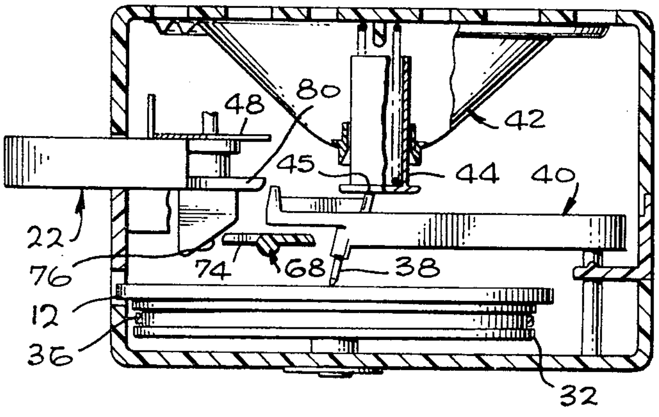
FIG. 7 is a view taken on the line 7—7 of FIG. 3.

When a child pushes inwardly on the replay knob 20 to replay the record, he causes the tone arm 40 and its stylus to be lifted off the record and then pivoted outwardly to the periphery of the record. Lifting of the tone arm is accomplished through an intermediate or tone arm lift lever 68 that is pivotally mounted on the housing. The lift lever 68 has a first arm 70 that lies beneath a projection 72 at the outer end of the tone arm, and a second arm 74 which is designed to be engaged by the control level 22. As shown in FIG. 7, the control lever 22 has a lift camming surface 76. Inward movement of the replay knob 20 of the control level causes the lift camming surface 76 to engage the second arm 74 of the lift lever and pivot it. As shown in FIG. 8, the first arm 70 of the lift lever then lifts the projection 72 on the tone arm, thereby lifting the stylus 38 off the record. The replay knob 20 continues to move inwardly in the direction of arrow 78 after the tone arm is lifted. As shown in FIG. 6, during such further inward movement, a tone arm return camming surface 80 then engages the tone arm projection 72 and pushes the tone arm out to the periphery of the record. As the tone arm moves outwardly, the member 66 on the tone arm releases the contact end 64 to allow re-energization of the motor. Accordingly, the turntable immediately begins rotating the record.

As soon as a child has depressed the replay knob 20, he releases it, to permit replaying of the record. Release of the replay knob 20 allows the control lever 22 to return to its original position wherein the return camming surface 80 is spaced from the tone arm, to allow it to track the groove, and the lift camming surface 76 is disengaged from the lift lever 68 to allow it to release the tone arm so the stylus can fall back onto the record. If the record has multiple spiral recorded tracks, the tracks will be played in a randomly selected manner, since the time of release of the replay knob by the child is randomly determined.

When a child releases the replay knob 20 the control lever 22 must spring back to its original position. As shown in FIG. 3, the return of the control lever is accomplished by a return arm 82 of the operator member 46 which is biased against a post 84 on the control lever 22.

When a child desires to remove the record, he depresses the eject knob 24 of the control lever 22. This causes lifting of the tone arm from the record and lifting of a spindle that holds down the record to the turntable, ejection of the record, and the opening of the electrical circuit to deenergize the motor. Most of these operations are performed by an eject lever 86 which is shown in FIG. 1. The eject lever 86 is pivotally mounted on a post 88 that extends from the middle housing member 30. A boss 90 on the eject lever is positioned to be contacted by an eject camming surface 92 on the control lever 22, so that when a child depresses the eject knob 24 of the control lever to pivot the control lever clockwise (as seen from above in the figure) he causes the eject lever 86 to also pivot clockwise.

The eject lever 86 has a spindle lifting cam surface 94 formed by the upper walls of a slot 96. A spindle 98 projects through the slot 96. The spindle has a lower record engaging end 100 and an upper cam follower end 102 engaged with the camming surface 94 to enable the eject lever to raise and lower the spindle. The eject lever also has a tone arm lift camming surface 104 which can engage a third arm 106 of the tone arm lifting lever 68 to cause it to lift the tone arm off the record. An ejecting finger 108 formed on the eject lever 86 can contact the edge of a record to push it out through the slot in the housing. A de-energizing camming surface 110 on the eject lever 86 can deflect the contact member end 60 to open the electrical circuit so as to de-energize the motor. The operation of these portions of the eject lever will be described below.

Figure 4:
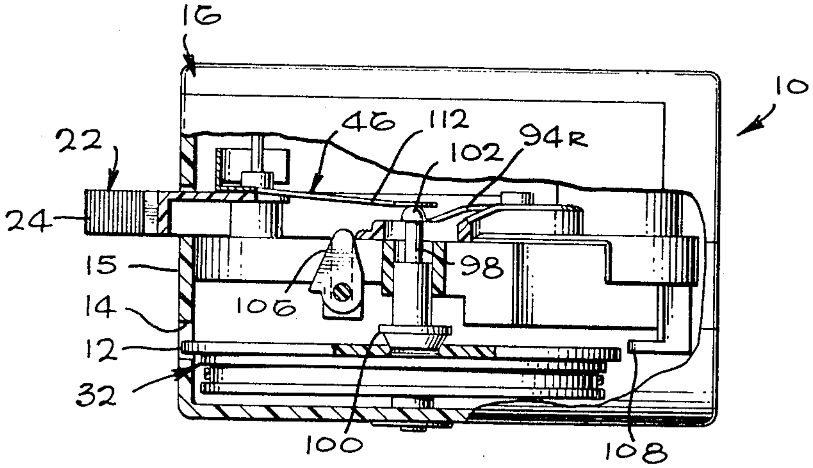
FIG. 4 is a view taken on the line 4—4 of FIG. 3.
Figure 9:
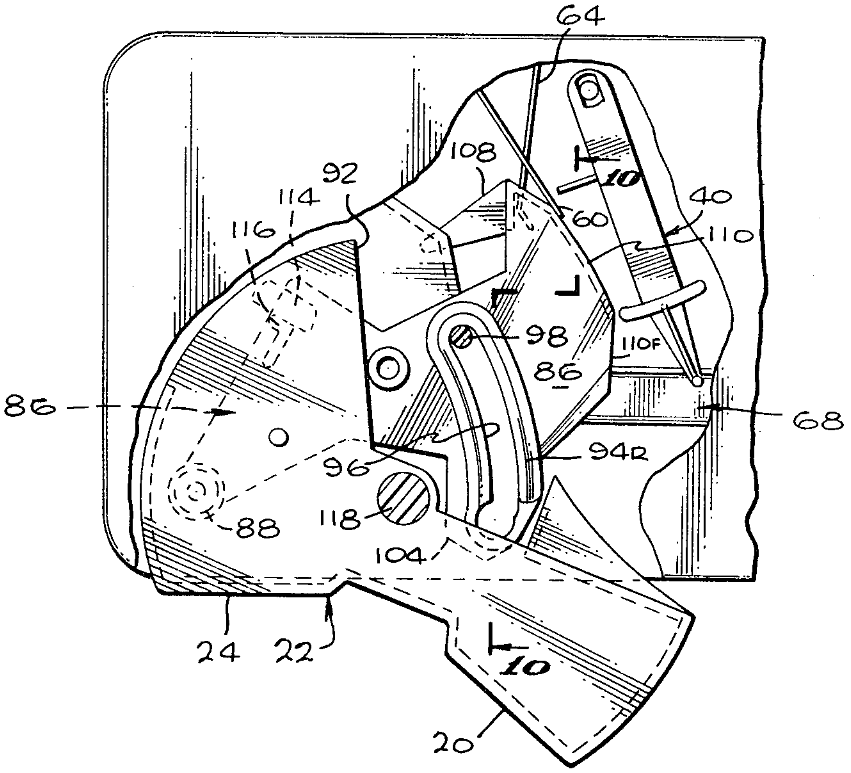
FIG. 9 is a partial view similar to FIG. 3, but showing the apparatus after ejection of a record from the phonograph.
Figure 10:
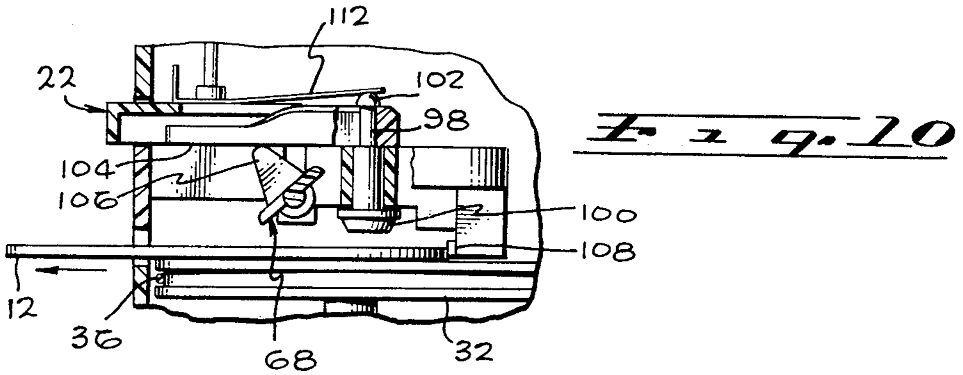
FIG. 10 is a view taken on the line 10—10 of FIG. 9.

FIG. 4 illustrates the situation prior to ejection of a record, showing the lower or record engaging end of the spindle 100 projecting partially into a hole at the center of the record 12 to keep it centered and to hold it against the turntable 32. The spindle is biased downwardly by an arm 112 of the operator member 46. Reference is now made to FIG. 9 which illustrates the situation which occurs when a child has fully depressed the eject knob 24 of the control lever to eject a record from the phonograph. When the knob 24 has been fully depressed, the camming surface 92 of the control lever has pushed the eject lever 86 to the illustrated position. During the first portion of rotation of the eject cam 86, a ramp portion 94R of the spindle lifting surface of the eject cam passes along the upper or cam follower end of the spindle 98 to raise the spindle off the record. At the same time, the tone arm lift camming surface 104 functions, as shown in FIG. 10, to pivot the third arm 106 of the tone arm lifting lever 68. As previously described in connection with the replay apparatus and FIG. 8, pivoting of the lever 68 causes the tone arm stylus to lift off the record. The combination of spindle raising and tone arm lifting frees the record to be ejected during the latter portion of pivoting of the eject lever 86.

Actual ejection of the record is accomplished by the record ejecting finger 108 of the eject cam 86, which is best shown in FIG. 9. The ejecting finger 108 is spaced a substantial distance from the axis of pivoting of the eject cam about the post 88, so that the record generally is ejected rapidly and protrudes from the phonograph. The de-energization of the motor during ejection of the record is accomplished by a front portion 110F of the de-energizing camming surface 110. The front portion 110F pushes the end 60 of the contact member away from the end 64 of the other contact member, to open the electrical circuit leading to the motor. The latter portion of the de-energizing camming surface 110 is at a constant distance from the post 88, and it merely serves to maintain the contact end 60 away from the other end 64. The portion 110F which actually breaks the electrical circuit is positioned so that the circuit is broken during the beginning of movement of the eject cam 86, so that the turntable is slowing down or stopped by the time the eject finger contacts the record to eject it. The camming surface 110 also contacts the tone arm 40 and pivots it towards the periphery of the turntable. Such movement of the tone arm prepares the apparatus for receiving and immediately playing a new record.

After the eject knob 24 is fully depressed, the control lever 22 and eject lever 86 remain in the orientation shown in FIG. 9. It is necessary to maintain the eject lever 86 in this position to ready it to receive another record, and to prevent the closing of the electrical contacts at 60 and 64 that could cause drain of the battery. Return of the eject cam 86 is prevented by reason of frictional drag produced by the deflected contact member end 60 and the downward force of the upper spindle end 102 (shown in FIG. 10) which is pushed down by the resilient arm 112. The eject cam 86 has no portion accessible to a child, so it is unlikely to be accidentally moved back from the eject position of FIG. 9 to the playing position. However, if the control lever 22 were not positively retained in position, it could be returned to its initial playing position by merely pressing on the replay knob 20. To prevent such movement of the control lever 22, it is provided with a stop 114 (FIG. 9) on its undersurface which contacts another stop 116 on the eject lever 86. The stop 116 on the eject lever 86 prevents pivoting of the control lever about the post 118 on which it is mounted, thereby maintaining the phonograph in the position shown in FIG. 9, until a new record is inserted.

When a record is inserted into the phonograph, it abuts the ejecting finger 108 of the eject cam 86 and pivots it counter clockwise towards the playing position. It may be noted that the stop 116 on the eject lever can pass by the stop 114 on the control lever during such pivoting. As the record pushes the eject lever 86 back to its playing position, the spindle 98 can move down to hold the record against the turntable, the tone arm 40 is released so its stylus can move down onto the record, and the contact ends 60 and 64 touch each other to begin energization of the motor.

Thus, the invention provides a toy phonograph which can be easily operated by a child, the phonograph automatically starting when a record is inserted, automatically replaying the record by the pressing of a single knob, and automatically ejecting the record by the pressing of another knob. Such automatic operation is achieved with a relatively simple mechanism. FIG. 1 illustrates the various parts, many of which are required in even the simplest manually operated toy phonograph, such as the housing members, the motor and turntable assembly, the speaker cone assembly, and the tone arm apparatus. The only additional parts required are the control lever 22, eject lever 86, spindle 98, lift lever 68, operator member 46, and the two conductive members 54, 56. Each of these members can be made in a single injection molding, except for the conductive members 46, 54 and 56 which can be made by stamping and bending thin sheet metal. The relative simplicity of the phonograph, considering its many functions, enables it to be constructed at low cost and therefore to be included in toys that are sold at a low price.

The installation of the phonograph mechanism in another toy such as a large doll, is simplified because all parts to which access must be provided are on a single surface. That is, the record-receiving slot 14, replay knob 20 and eject knob 24 are located on one surface 15, as shown in FIG. 2. Installation in a doll can be performed by providing a single large recess in the back of the doll and holding the phonograph therein. No additional openings are required to provide access to the controls.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. In a toy phonograph which includes a turntable, a spindle for holding a record against the turntable, and a tone arm for following along a spiral record groove, the improvement comprising:

a housing having a plurality of surfaces, including a predetermined front surface, said front surface having an elongated slot therein for receiving disc shaped records;

control lever means including a replay knob and an eject knob, each of said knobs mounted to extend forwardly from said front surface;

first means responsive to operation of said replay knob for lifting said tone arm away from said turntable and moving it towards the periphery of said turntable; and second means responsive to operation of said eject knob for moving said spindle away from said turntable and urging a record on said turntable out through said slot.

2. The toy phonograph described in claim 1 wherein:

said control lever means includes a lever having a center portion pivotally mounted on said housing and having portions on opposite sides of said center portion forming said replay and eject knobs, respectively, so that when one knob is pressed inwardly the other moves outwardly.

3. A toy phonograph for playing a disc record with a spiral groove comprising:

a housing with a slot therein for receiving a record;

a turntable;

a spindle mounted to move towards and away from said turntable;

motor means for driving said turntable;

a tone arm pivotally mounted to track a spiral record groove and to move off and onto a record;

a control lever pivotally mounted on said housing and having replay and eject knob portions projecting from said housing for enabling manual pivoting of said lever in opposite directions;

first means coupled to said control lever to raise said tone arm and move it towards the periphery of said turntable when said control lever is pivoted during depression of said replay knob portion; and second means coupled to said control lever to raise said spindle, raise said tone arm, and eject said record through said slot when said control lever is pivoted during depression of said eject knob portion thereof.

4. The toy phonograph described in claim 3 wherein:

said motor means includes an electric motor with terminals; and said housing includes a battery compartment for holding at least one battery with terminals; and including first and second contact members constructed of electrically conductive spring material, said first member having one end connected to a motor terminal and a second free end, and said second contact member having one end located within said battery compartment to directly contact a battery terminal and another end biased against said free end of said first contact member;

means on said tone arm for separating said contact members as said tone arm approaches the center of said spiral groove; and means coupled to said second means for separating said contact members as said control lever is pivoted during depression of said eject knob portion thereon.

5. The toy phonograph described in claim 3 wherein:

said housing has a plurality of distinct surfaces, one of them defining said slot; and said replay and eject knob portions are arranged to project from said surface which defines said slot, whereby to facilitate mounting of the phonograph in another toy.

6. A toy phonograph for playing a disc record comprising:

a housing with a slot therein for receiving a record;

a turntable for rotating said record;

motor means for driving said turntable;

a spindle mounted for slidable movement towards and away from said turntable to hold and release a record therefrom; and an eject lever pivotally mounted on said housing to pivot between playing and ejecting positions, said lever having a finger for engaging a record to eject it when said lever is pivoted toward said ejecting position and to receive forces from a record inserted through said slot to pivot said lever towards said playing position, said lever having a spindle-receiving slot extending at a constant radial distance from the axis of pivoting of said lever, said spindle extending through said slot, and said eject lever having spindle camming walls on either side of said slot engaged with said spindle, said spindle camming walls including a first portion at a constant distance from said turntable and a second ramp portion of progressively decreasing distance from said turntable at locations progressively spaced from said first portion.

7. The toy phonograph described in claim 6 including:

said motor means includes an electrically energizable motor with terminals and walls defining a battery compartment for holding at least one battery with terminals; and a leaf spring member of electrically conductive material having a first arm electrically connected to one of said motor terminals, a second arm positioned to contact a terminal of a battery in said battery compartment, and a third arm biased against said spindle to urge it towards said turntable.

8. A toy phonograph for playing a disc record comprising:

a housing;

a turntable rotatably mounted on said housing;

a tone arm which has a stylus for entering the grooves of a record, said tone arm mounted to pivot in a direction to track the record groove and to move the stylus off and onto the record;

a lift lever pivotally mounted on said housing and having a lifting portion for raising said tone arm to move the stylus off a record; and a control lever pivotally mounted on said housing, said control lever having a manually depressible replay knob portion, a first camming surface for engaging said lift lever to pivot it in a direction to lift said stylus off a record, and an arcuate second camming surface for engaging said tone arm to pivot it towards the periphery of a record.

9. The toy phonograph described in claim 8 including:

an eject lever pivotally mounted on said housing, said lever having a finger for engaging the rim of a record to push it out of said housing; and wherein said control lever has a manually operable eject knob portion formed thereon on a side of the axis of pivoting of said control lever opposite said replay knob portion, for pivoting said replay lever in a direction opposite to the direction in which it pivots when said replay knob portion is depressed; and said control lever has an eject camming surface for moving said eject lever in a direction to push a record out of the housing when said eject knob portion is depressed.

10. The toy phonograph described in claim 9 including:

a first stop member mounted on said replay lever; and a second stop member mounted on said eject lever to prevent pivoting of said replay lever in said first direction when said eject lever is in the position which it assumes after ejecting a record.

11. A toy phonograph comprising:

a housing, including a battery compartment and walls defining a record-receiving slot;

a turntable rotatably mounted on said housing;

an electric motor mounted on said housing and coupled to said turntable to drive it;

a spindle mounted on said housing to move towards and away from said turntable;

a tone arm assembly pivotally mounted on said housing, including a stylus for engaging a record;

a tone arm lift lever pivotally mounted on said housing for lifting said tone arm away from a record on said turntable;

a speaker cone assembly for acoustically amplifying sounds, including an armature biased against said tone arm assembly;

an eject lever pivotally mounted on said housing for moving between a playing position and an eject position, said eject lever having a finger for ejecting a record from said housing and for receiving forces from a record that is being inserted into the housing, a spindle camming surface engaged with said spindle including a portion inclined towards said turntable for moving said spindle towards said turntable as said eject lever approaches its playing position, a lift camming surface for pivoting said tone arm lift lever to lift said tone arm as said eject lever moves towards said eject position, and a tone arm camming surface for pivoting said tone arm towards the periphery of said turntable as said eject lever moves towards said eject position; and a control lever pivotally mounted on said housing and having manually depressible eject and replay knobs projecting from said housing for manual pivoting of said control lever in opposite directions, said control lever having an eject camming surface for engaging said eject lever to pivot it towards said eject position when said control lever pivots as said eject knob is depressed, and said control lever having a lift camming surface for engaging said tone arm lift lever and a return camming surface for moving said tone arm towards the periphery of said turntable when said control lever is pivoted as said replay knob is depressed.

12. The toy phonograph described in claim 10 including:

an operator-contactor member constructed of electrically conductive spring material, having a first arm positioned in said battery compartment to contact a terminal of a battery therein, a second arm in contact with a terminal of said motor, a third arm disposed against said spindle to urge it towards said turntable, and a fourth arm engaged with said control lever to bias it opposite to the direction in which it pivots when said replay knob is depressed.

* * * * *